(12) United States Patent
Humborstad

(10) Patent No.: US 10,922,598 B2
(45) Date of Patent: Feb. 16, 2021

(54) FINGERPRINT AUTHORISABLE DEVICE

(71) Applicant: ZWIPE AS, Oslo (NO)

(72) Inventor: Kim Kristian Humborstad, Oslo (NO)

(73) Assignee: ZWIPE AS, Oslo (NO)

( * ) Notice: Subject to any disclaimer, the term of this patent is extended or adjusted under 35 U.S.C. 154(b) by 7 days.

(21) Appl. No.: 16/797,046

(22) Filed: Feb. 21, 2020

(65) Prior Publication Data

US 2020/0193254 A1 Jun. 18, 2020

Related U.S. Application Data

(63) Continuation of application No. 16/081,608, filed as application No. PCT/EP2017/054778 on Mar. 1, 2017, now abandoned.

(30) Foreign Application Priority Data

Mar. 2, 2016 (GB) ..................................... 1603602

(51) Int. Cl.
*G06K 19/07* (2006.01)
*G06F 21/32* (2013.01)

(52) U.S. Cl.
CPC ......... *G06K 19/0718* (2013.01); *G06F 21/32* (2013.01); *G06K 19/0719* (2013.01)

(58) Field of Classification Search
CPC . G06K 19/0718; G06K 19/0719; G06F 21/32
See application file for complete search history.

(56) References Cited

U.S. PATENT DOCUMENTS

| 8,622,308 | B1 | 1/2014 | Field et al. |
| 9,177,133 | B1 | 11/2015 | Toth et al. |
| 2003/0005336 | A1 | 1/2003 | Poo et al. |
| 2005/0226468 | A1 | 10/2005 | Deshpande et al. |

(Continued)

FOREIGN PATENT DOCUMENTS

| CN | 104573451 A | 4/2015 |
| EP | 2128805 A1 | 12/2009 |

(Continued)

OTHER PUBLICATIONS

International Search Report and Written Opinion, PCT/EP2017/054778, dated Jun. 23, 2017 (16 pp.).
GB Search Report, GB 1603602.2, dated Aug. 25, 2016 (5 pp.).

*Primary Examiner* — Laura A Gudorf
(74) *Attorney, Agent, or Firm* — Eversheds Sutherland (US) LLP

(57) ABSTRACT

A fingerprint authorisable smartcard may include a fingerprint sensor for obtaining fingerprint data from a user's finger or thumb, and a control system for controlling the smartcard. The control system may be arranged to provide access to one or more functions of the smartcard in response to identification of an authorised fingerprint and the control system further may include a fingerprint failure feature in which a non-fingerprint authorisation can act to at least partially replace the fingerprint authorisation such that the control system may be arranged to provide access to at least some of the one or more functions of the smartcard when a user is identified via the non-fingerprint authorisation. The non-fingerprint authorisation may require an interaction with the fingerprint authorisable smartcard by the user, the interaction including one or more action(s) detected via the fingerprint sensor.

18 Claims, 3 Drawing Sheets

(56) References Cited

U.S. PATENT DOCUMENTS

| | | |
|---|---|---|
| 2009/0237223 A1 | 9/2009 | Zimmerman et al. |
| 2010/0033299 A1 | 2/2010 | Davis |
| 2010/0044443 A1 | 2/2010 | Yamamoto |
| 2013/0129162 A1 | 5/2013 | Cheng et al. |
| 2014/0101737 A1 | 4/2014 | Rhee |
| 2014/0118520 A1 | 5/2014 | Slaby et al. |
| 2014/0270414 A1 | 9/2014 | Slaby et al. |
| 2014/0359757 A1 | 12/2014 | Sezan et al. |
| 2015/0016695 A1 | 1/2015 | Yoon |
| 2015/0074615 A1 | 3/2015 | Han et al. |
| 2015/0213244 A1 | 7/2015 | Lymberopoulos et al. |
| 2017/0154328 A1 | 6/2017 | Zarakas et al. |

FOREIGN PATENT DOCUMENTS

| | | |
|---|---|---|
| EP | 2251818 A1 | 11/2010 |
| JP | H0240566 | 2/1990 |
| JP | 2002043645 A | 2/2002 |
| WO | 0021020 | 4/2000 |
| WO | 2008104567 A1 | 9/2008 |
| WO | 2013151797 A1 | 10/2013 |
| WO | 2016007187 A1 | 1/2016 |

FINGERPRINT AUTHORISABLE DEVICE

RELATED APPLICATIONS

The present application is a continuation of U.S. application Ser. No. 16/081,608, filed on Aug. 31, 2018, now pending, which, in turn, is a National Phase application of International Application No. PCT/EP2017/054778, filed on Mar. 1, 2017. U.S. application Ser. No. 16/081,608 and International Application No. PCT/EP2017/054778 are incorporated herein by reference in full.

TECHNICAL FIELD

The present invention relates to a fingerprint authorisable device and to a method for controlling a fingerprint authorisable device.

BACKGROUND OF THE INVENTION

Fingerprint authorised devices such as smartcards are becoming increasingly more widely used. Smartcards for which biometric authorisation has been proposed include, for example, access cards, credit cards, debit cards, pre-pay cards, loyalty cards, identity cards, cryptographic cards, and so on. Smartcards are electronic cards with the ability to store data and to interact with the user and/or with outside devices, for example via contactless technologies such as RFID. These cards can interact with sensors to communicate information in order to enable access, to authorise transactions and so on. Other devices are also known that make use of biometric authorisation such as fingerprint authorisation, and these include computer memory devices, building access control devices, military technologies, vehicles and so on.

In some cases a fingerprint authorisation may fail or may not be possible. For example the user's fingerprints may be damaged by injury, or covered up. The sensor may also be damaged or might otherwise be inoperable. Another situation that can arise with fingerprint sensors is a failure to enroll. This is a fundamental issue with a small percentage of the population, who have fingerprints that for some reason cannot be registered using some or all sensors, and it also arises when people have missing or damaged fingers. In addition, some users do not wish to record their fingerprint details. In existing fingerprint authorisable devices this presents a major problem, and often means that an alternative device must be provided for some users.

SUMMARY OF THE INVENTION

Viewed from a first aspect the present invention provides a fingerprint authorisable device comprising: a fingerprint sensor for obtaining fingerprint data from a user's finger or thumb, and a control system for controlling the device, wherein the control system is arranged to provide access to one or more functions of the device in response to identification of an authorised fingerprint, wherein the control system further includes a fingerprint failure feature in which a non-fingerprint authorisation can act to at least partially replace the fingerprint authorisation such that the control system is arranged to provide access to at least some of the one or more functions of the device when a user is identified via the non-fingerprint authorisation, and wherein the non-fingerprint authorisation requires an interaction with the fingerprint authorisable device by the user, the interaction including one or more action(s) detected via the fingerprint sensor.

Thus, with the fingerprint authorisable device of this aspect it is possible for users that are unable to enroll for fingerprint authorisation to still use some or all of the features of the device by means of the non-fingerprint authorisation. The non-fingerprint authorisation also provides a way for enrolled users to continue to use the device when they are not able to provide fingerprint authorisation, for example due to an injury that prevents access to or damages the enrolled fingerprint(s). Further, as noted above some users may not wish to enroll via fingerprint, and this feature allows for those users to use the device based purely on non-fingerprint authorisation, whilst at the same time still using the fingerprint sensor as an input for interaction with the device and with the authorisation process. The fingerprint sensor is used for part of or all of the non-fingerprint authorisation process, meaning that the proposed non-fingerprint authorisation can be carried out with no requirement for adding further sensors to the device, although if other sensors are present then these may be utilised as explained below. The modification to allow for the enrolment failure feature may be implemented based purely on an adjustment to the control system for the device, which may advantageously be purely a software modification in some cases.

The action(s) detected via the fingerprint sensor may include one or more of a stationary contact with the sensor, a moving contact with the sensor, a time period of contact with the sensor, a direction of movement of contact with the sensor, a number of contacts with the sensor, or a time period where there is no contact with the sensor (i.e. a time period between contacts). Preferably the non-fingerprint authorisation requires a combination of different actions, which may include a sequence of actions on the fingerprint sensor and/or at least one action on the fingerprint sensor in combination with at least one action via another input or sensor.

The contact may be any contact detectable via the fingerprint sensor of the device. The nature of fingerprint sensors means that they are arranged to identify contact with the skin and so the contact may be a contact of the skin, for example contact with a fingertip or thumbtip. The user may for some reason have fingerprint characteristics that are not able to be enrolled, or they may have decided not to enroll their fingerprint and hence the interactions with the fingerprint sensor that are used during the non-fingerprint authorisation may be distinguished from interactions during fingerprint authorisation by the fact that the fingerprint sensor is not used to gather a sufficient level of information about the contact to enable a fingerprint authorisation.

An action in the form of stationary contact detected by the fingerprint sensor may include a detection of the presence of a contact, as distinct from the absence of a contact. Alternatively, the action(s) detected by the fingerprint sensor may include a detection of characteristics of the contact that allow for differentiation between two different contacts, e.g. a difference between one person's thumb contact and another person's thumb contact, but are not sufficiently detailed or complex for full fingerprint enrolment. These characteristics could be stored in the same way as fingerprint data for enrolled users.

An action in the form of a moving contact detected by the fingerprint sensor may include a detection of the direction of movement and/or a speed of the movement. The direction may be identified relative to one or more axes of the device. For example in the case of a smartcard the control system may be arranged to distinguish between a contact moving parallel with the long side of the card and a contact moving parallel with the short side of the card. The action(s) may include a sequence with parallel and/or perpendicular movements, or more complex movements defined by the user, such as a rotating contact or a circular movement.

Whether the fingerprint sensor is used to simply detect the presence of a contact or to detect more complex characteristics the actions detected by the fingerprint sensor may include a time period of one or more contacts, a number of contacts and/or the spacing in between contacts, similar to codes such as Morse code, for example. The interaction with the device required for the non-fingerprint authorisation may hence include or consist of a code input by a sequence of stationary or moving contacts with the sensor.

When the non-fingerprint authorisation is used to access the one or more functions of the device, then the user may be permitted access to all of the functions that are accessible via the fingerprint authorisation, or the user may only be given restricted access to these functions. In one possible implementation in the case of a failure to enroll, i.e. where there is no fingerprint data available for fingerprint authorisation, then the user may be permitted full access to the one or more functions of the device using the non-fingerprint authorisation. This then enables the device to be used fully by a person that is unable or unwilling to enroll, albeit with potentially reduced security. In the case where there is fingerprint data but for some reason the user cannot complete the fingerprint authorisation process, e.g. in the case of an injury to the finger, then the device may be arranged to allow only partial access in response to the non-fingerprint authorisation. This can allow for restricted use of the device when a user who normally uses fingerprint authorisation is temporarily unable to provide fingerprint authorisation or decides to use the non-fingerprint authorisation. For example, in the case where the device is a smartcard use for financial transactions then the non-fingerprint authorisation might permit payments with a limit on the size of the payments, whereas fingerprint authorisation may permit payments without limit or with a larger limit.

The authorised user may initially enroll their fingerprint with the device, optionally indirectly through some other device, but preferably directly onto the device via the fingerprint sensor, and may then typically be required to place their finger or thumb on the fingerprint sensor in order to authorise some or all uses of the device. A fingerprint matching algorithm in the control system may be used to identify a fingerprint match between an enrolled user and a fingerprint sensed by the fingerprint sensor. In the event of a failure to match the fingerprint, the control system may issue a prompt for a non-fingerprint authorisation.

It is preferred for the device to be arranged so that it is impossible to extract the data used for identifying users via fingerprint and/or non-fingerprint authorisation, example by a fingerprint template or the like. The transmission of this type of data outside of the device is considered to be one of the biggest risks to the security of the device.

To avoid any need for communication of the fingerprint data outside of the device then the device may be able to self-enroll, i.e. the control system may be arranged to enroll an authorised user by obtaining fingerprint data via the fingerprint sensor. This also has advantages arising from the fact that the same sensor with the same geometry is used for the enrolment as for the fingerprint authorisation. The fingerprint data can be obtained more consistently in this way compared to the case where a different sensor on a different device is used for enrolment. With fingerprint biometrics, one problem has been that it is difficult to obtain repeatable results when the initial enrolment takes place in one place, such as a dedicated enrolment terminal, and the subsequent enrolment for matching takes place in another, such as the terminal where the matching is required. The mechanical features of the housing around each fingerprint sensor must be carefully designed to guide the finger in a consistent manner each time it is read by any one of multiple sensors. If a fingerprint is scanned with a number of different terminals, each one being slightly different, then errors can occur in the reading of the fingerprint. Conversely, if the same fingerprint sensor is used every time then the likelihood of such errors occurring is reduced.

In accordance with the proposed device, both the matching and enrolment scans may be performed using the same fingerprint sensor. As a result, scanning errors can be balanced out because, for example, if a user tends to present their finger with a lateral bias during enrolment, then they are likely to do so also during matching.

The control system may have an enrolment mode in which a user may enroll their fingerprint via the fingerprint sensor, with the fingerprint data generated during enrolment being stored on the memory. The control system may be arranged to prompt the user for enrolment of a non-fingerprint authorisation code in addition to fingerprint enrolment (i.e. to allow for later failures in fingerprint authorisation) and/or in the event of a failure to enroll the user.

The control system may be in the enrolment mode when the device is first provided to the user, so that the user can immediately enroll their fingerprint data. The first enrolled user may be provided with the ability to later prompt an enrolment mode for subsequent users to be added, for example via input on an input device of the device after identification has been confirmed. Alternatively or additionally it may be possible to prompt the enrolment mode of the control system via outside means, such as via interaction between the device and a secure system, which may be a secure system controlled by the manufacturer or by another authorised entity.

The control system may include a fingerprint processor for executing the fingerprint matching algorithm and a memory for storing fingerprint data for enrolled fingerprints. The control system of the device may include multiple processors, wherein the fingerprint processor may be a separate processor associated with the fingerprint sensor. Other processors may include a control processor for controlling basic functions of the device, such as communication with other devices (e.g. via contactless technologies), activation and control of receivers/transmitters, activation and control of secure elements such as for financial transactions and so on. The various processors could be embodied in separate hardware elements, or could be combined into a single hardware element, possibly with separate software modules.

The device may be a portable device, by which is meant a device designed for being carried by a person, preferably a device small and light enough to be carried conveniently. The device can be arranged to be carried within a pocket, handbag or purse, for example. The device may be a smartcard such as a fingerprint authorisable RFID card. The device may be a control token for controlling access to a system external to the control token, such as a one-time-password device for access to a computer system or a fob for a vehicle keyless entry system. The device is preferably also portable in the sense that it does not rely on a wired power source. The device may be powered by an internal battery and/or by power harvested contactlessly from a reader or the like, for example from an RFID reader.

The device may be a single-purpose device, i.e. a device for interacting with a single external system or network or for interacting with a single type of external system or network, wherein the device does not have any other purpose. Thus, the device is to be distinguished from complex and multi-function devices such as smartphones and the like.

Where the device is a smartcard then the smartcard may be any one of: an access card, a credit card, a debit card, a pre-pay card, a loyalty card, an identity card, or the like. The smartcard preferably has a width of between 85.47 mm and 85.72 mm, and a height of between 53.92 mm and 54.03 mm. The smartcard may have a thickness less than 0.84 mm, and preferably of about 0.76 mm (e.g. ±0.08 mm). More generally, the smartcard may comply with ISO 7816, which is the specification for a smartcard.

Where the device is a control token it may for example be a keyless entry key for a vehicle, in which case the external system may be the locking/access system of the vehicle and/or the ignition system. The external system may more broadly be a control system of the vehicle. The control token may act as a master key or smart key, with the radio frequency signal giving access to the vehicle features only being transmitted in response to fingerprint identification of an authorised user. Alternatively the control token may act as a remote locking type key, with the signal for unlocking the vehicle only being able to be sent if the fingerprint authorisation module identifies an authorised user. In this case the identification of the authorised user may have the same effect as pressing the unlock button on prior art keyless entry type devices, and the signal for unlocking the vehicle may be sent automatically upon fingerprint or non-fingerprint identification of an authorised user, or sent in response to a button press when the control token has been activated by authentication of an authorised user.

The non-fingerprint authorisation may include interactions with the fingerprint sensor and optionally with one or more further sensor. In some implementations no sensors are added compared to a 'standard' device without the non-fingerprint authorisation, but where additional sensors are already present then the non-fingerprint authorisation may include interactions with such devices as well as the interaction(s) with the fingerprint sensor. Additional sensors on the fingerprint authorisable device may include one or more button, capacitive sensor or accelerometer, for example.

Thus, the device may comprise an accelerometer for sensing movements of the device, wherein the control system is arranged to identify movements of the device based on the output of the accelerometer, and wherein the non-fingerprint authorisation includes a combination of one or more action(s) detected via the fingerprint sensor as well as a movement sensed by the accelerometer.

The various possible ways for the user to interact with the device, including action(s) detected via the fingerprint sensor, movements detected by an accelerometer and/or inputs via buttons or other sensors may be used as instructions for the control system to switch between different modes of multiple operating modes of the device.

The movements sensed by the accelerometer may include rotation of the device in one or more directions (clockwise/anticlockwise) and/or in one or more than one axis of rotation, translation of the device in one or more directions (forward/backward) and along one or more axis, and/or accelerations in one or more directions (forward/backward) and along one or more axis as well as jerk or impulses in one or more directions (forward/backward) and along one or more axis. Combinations of these movements may also be detected, for example a "flick" motion including a combination of translation and acceleration/deceleration to characterise the movement detected by the accelerometer. When the device is a smartcard then the axes referenced above may for example be x, y, z axes aligned with the long side of the card, the short side of the card, and the normal to the card. The accelerometer may also be arranged to detect a free fall movement, for example when the device is dropped. The use of accelerometers to detect free fall is well-established and is used, for example, to activate safety features of hard disk drives to prevent damage when they are dropped.

Rotations of the device sensed by the accelerometer may include changes in orientation of the device, for example switching a smartcard from portrait to landscape orientation or turning the card over. The rotations may include 90 degree turns, 180 degree turns, 270 degree turns or 360 degree turns, or intervening values, in any direction.

Translational movements may include waving motions, optionally in combination with acceleration/deceleration as with a flicking type motion, or a tapping motion.

The control system may be arranged to identify the movements of the device based on the output of the accelerometer, and use this in the non-fingerprint authorisation and/or change the operating mode of the device in response to pre-set movements. The pre-set movements may include any or all movements discussed above. In addition, the control system may determine the length of a time period without motion, i.e. a time period indicative of no active usage of the device, and this may also be used to change the operating mode of the device. The control system may also be arranged to identify repeated movements or sequences of movements, such as a double tap, or a translational movement followed by a rotation such as a sliding and twisting motion. Advantageously, the device may be arranged to allow the user to set their own movements and or combinations of movements. For example the control system may have a learn mode where a combination of movements by the user can be taught to the control system and then allocated to a specific change in the operating mode of the device. This can provide for increased security by the use of movements that may be unique to each individual.

The operating modes of the device that are controlled by the interaction of the user with the device may be related to a high level function, for example turning the device on or off, activating secure aspects of the device such as contactless payment, or changing the basic functionality of the device for example by switching a smartcard between operating as an access card, a payment card, or a transportation smartcard, switching between different accounts of the same type (e.g. two bank accounts) and so on.

Alternatively or additionally the operating modes of the device that are controlled by interaction of the user with the device may concern more specific functionalities of the device, for example switching between communications protocols (such as blue tooth, wifi, NFC) and/or activating a communication protocol, activating a display such as an LCD or LED display or obtaining an output from the device, such as a one-time-password or the like.

Alternatively or additionally the operating modes of the device that are controlled by interaction of the user with the device may include prompting the device to automatically perform a standard operation of the device. Examples of such standard operations might include a pre-set cash withdrawal in response to a specific movement during or prior to communication with an ATM, entering into a learning or set-up mode, PIN activation of a smartcard (i.e. movements used in place of a PIN entry via a keypad on an external card reader), sending a message to a contactless reader or a smartphone (e.g. via NFC) and so on.

The control system may be arranged to allow for the user to specify which interactions (including combinations of different interactions or movements) should activate particular operating modes, and/or to specify movements to be used as a part of the non-fingerprint authorisation. The control system may use different movements for each one of a set of operating modes, or alternatively it may cycle through the operating modes of a set of operating modes in response to a repeated movement.

Examples of combinations of movements and changes in the operating mode of the device include: flicking a smartcard to switch the card application between, for example, access card, payment card, transport system card, turning on the device via a pre-set (preferably user specified) activation gesture, turning the device 180 degrees to switch between blue tooth and NFC, double tap on a surface to activate a display and so on.

One example includes placing the device into a dropped device mode when free fall is detected. This mode may require reauthorisation via a security feature after the device has been picked up before further use of the device is permitted, or before full use of the device is permitted. This can ensure that a dropped device cannot be fraudulently used if found by an unauthorised user. The security feature may be the fingerprint authorisation, the non-fingerprint authorisation, and/or use of a PIN at a card reader for a smartcard. In one example for a payment card there might be no authorisation for an automatic transaction via contactless payments after the card is dropped until a subsequent authorisation is provided.

The device may enter a dormant/off mode and require re-activation or reauthorisation for continued use after it has been left unused for a period of time, for example for several days or several weeks depending on the application. A re-activation may require a specific sequence of movements to be detected, or activation via interaction with a sensor. A reauthorisation may be as discussed above in relation to the dropped device mode.

Although movements can be detected by an accelerometer with a single sensing axis, it is preferred to be able to detect accelerations in all directions. This may be done via multiple accelerometers, but preferably a single accelerometer is used that can detect acceleration in all directions, such as a tri-axis accelerometer.

The accelerometer may be a micro-machined accelerometer such as a MEMS accelerometer. Alternatively a piezoelectric sensor may be used, such as a dedicated piezoelectric accelerometer or another piezoelectric sensor that can sense accelerations (e.g. a piezoelectric sounder or microphone). The use of these types of accelerometers allows for them to be installed on a portable device such as a without the need for increasing the size of the device. They also have low power consumption, which can be another design restriction for portable devices such as smartcards. Piezoelectric sensors may advantageously be incorporated into the device in such a way that there is zero power consumption until an input is detected by the piezoelectric sensor. The accelerometer may use a sense element such as a micromachined cantilever or seismic mass. In an example implementation the acceleration sensing is based on the principle of a differential capacitance arising from acceleration-induced motion of the sense element. A possible accelerometer that could be used is a Tri-axis Digital Accelerometer such as those provided by Kionix, Inc. of Ithaca, N.Y., USA. An example embodiment uses the Kionix KXCJB-1041 accelerometer.

The device may be capable of wireless communication, such as using RFID or NFC communication. Alternatively or additionally the device may comprise a contact connection, for example via a contact pad or the like such as those used for "chip and pin" payment cards. In various embodiments, the device may permit both wireless communication and contact communication.

Viewed from a second aspect, the invention provides a method for controlling a fingerprint authorisable device having a fingerprint sensor for obtaining fingerprint data from a user's finger or thumb, and a control system for controlling the device; the method comprising: providing access to one or more functions of the device in response to identification of an authorised fingerprint; and alternatively or additionally providing access to at least some of the one or more functions of the device when a user is identified via a non-fingerprint authorisation as a part of a fingerprint failure feature of the control system in which a non-fingerprint authorisation can act to at least partially replace the fingerprint authorisation; wherein the non-fingerprint authorisation requires an interaction with the fingerprint authorisable device by the user, the interaction including one or more action(s) detected via the fingerprint sensor.

The method may include features as described above in connection with the fingerprint authorisable device. Thus, the action(s) detected via the fingerprint sensor may include one or more action(s) as described above. The device may have any or all features described above. For example the method may involve the use of a device including an accelerometer and may hence include detecting movements of the device and using those movements in relation to the non-fingerprint authorisation and/or to prompt a change in operating mode. The method may include using a fingerprint matching algorithm in the control system to identify a fingerprint match between an enrolled user and a fingerprint sensed by the fingerprint sensor. The method may include using an enrolment mode of the control system to enroll an authorised user by obtaining fingerprint data via the fingerprint sensor. The control system may have an enrolment mode in which a user may enroll their fingerprint via the fingerprint sensor, with the user being prompted for enrolment of a non-fingerprint authorisation code in addition to fingerprint enrolment (i.e. to allow for later failures in fingerprint authorisation) and/or in the event of a failure to enroll the user.

The non-fingerprint authorisation may include interactions with the fingerprint sensor and optionally with one or more further sensor, as discussed above.

In a third aspect, the present invention provides a computer programme product comprising instructions that, when executed on a control system in a fingerprint authorisable device as described above, will cause the control system to provide access to one or more functions of the device in response to identification of an authorised fingerprint; and to alternatively or additionally provide access to at least some of the one or more functions of the device when a user is identified via a non-fingerprint authorisation as a part of a fingerprint failure feature of the control system in which a non-fingerprint authorisation can act to at least partially replace the fingerprint authorisation; wherein the non-fingerprint authorisation requires an interaction with the fingerprint authorisable device by the user, the interaction including one or more action(s) detected via the fingerprint sensor. The instructions may be arranged to cause the control system to operate in accordance with any or all of the optional and preferred features discussed above.

It will be appreciated from the discussion above that an existing fingerprint authorisable device with a fingerprint sensor for fingerprint authorisation and a control system for controlling the device can be modified to implement the advantageous fingerprint failure feature described herein. This can be done by installing a computer programme product as described above. Another aspect of the invention hence provides a method of adapting a fingerprint authorisable device in order to provide a fingerprint failure feature, wherein the fingerprint authorisable device comprises a fingerprint sensor for obtaining fingerprint data from a user's finger or thumb, and a control system for controlling the device; the method comprising installing a computer programme product as described above on the fingerprint authorisable device.

In a fourth aspect that is not presently claimed, the present invention provides a smartcard having multiple operating modes, the smartcard comprising a processor for controlling operation of the smartcard and an accelerometer for sensing movements of the smartcard, wherein the processor is arranged to switch between different modes of the multiple operating modes in response to the movements sensed by the accelerometer.

This smartcard provides additional functionality by allowing interaction between the user and the smartcard using movements or gestures by a user holding or touching the card. This can allow for alternative card features to be activated without the need for manipulation of input devices on the card such as buttons or other sensors needing direct physical contact. Advantageously the smartcard is a contactless card and thus the user can switch between different modes as well as using the card via card readers with the only contact being holding of the card by the user. This can allow for increased features and increased complexity in how the smartcard is used, without detriment to the ease of operation of the card.

The movements sensed by the accelerometer may be as discussed above, for example. The smartcard of this aspect may include any or all features discussed above for the device of the first aspect.

The accelerometer measures a vibrational/movement pattern that is specific to the sequence selected by the user. The processor may be arranged to receive and record a movement pattern that is to be enrolled to the smartcard. Alternatively or additionally the accelerometer output data produced by the movement pattern may be transmitted from the card during enrolment and recorded in an external database. The processor may be arranged to permit access to the one or more secure feature(s) when both of the movements sensed by the accelerometer are determined to be a match with an enrolled movement pattern and there is authentication of the user's identity via the biometric sensor.

The output of the accelerometer is unique to the sequence of movements made by the user, and also unique to the smartcard. Each smartcard will have its own natural frequency as well as reacting dynamically to interactions of the user with the card in a different way to other cards. For example, a stiffer card will move differently after the user waves or taps the card than a more flexible card. Thus, it is important to understand that movements of the card that are detected by the accelerometer will include the effects of the dynamic reaction of the smartcard. The discussion herein of movements detected by the accelerometer should be understood in that context. The output signal (i.e. the accelerometer output data) from the accelerometer is a representation of the dynamic reaction of the smartcard as well as the movement that are made.

Since the accelerometer output data is specific to both the user and the card, then the data cannot be duplicated. If a "fake" card is produced and the tap sequence data is "injected" into the microprocessor, the dynamic reaction of the new card will be different from the original card, so therefore it cannot be hacked by mimicking the movement pattern. In the case of smartcards that are mass produced then it is likely that tolerances and inevitable small variations in the construction of the smartcards will lead to differences in the characteristics of the movements of the smartcard.

To enhance the distinctions between mass produced smart cards manufactured using the same basic process then the manufacturing method may include varying the location of the accelerometer and/or adding mass/stiffness elements with differing characteristics to the cards so that each individual card has a fully unique movement pattern. Thus, the smartcard may include an added mass or stiffness element in some examples. If another user tries to use the original card by following the owner's tap sequence, the manner in which the fraudulent user holds the card (for example, after successfully creating a false biometric acceptance), and his/her tapping mannerisms will also create a different resonance.

The smartcard may comprise a biometric sensor, such as a fingerprint sensor, which is preferably embedded into the card. With this feature the authorised user may initially enroll their fingerprint onto the actual card, and may then be required to place their finger or thumb on the fingerprint sensor in order to authorise some or all uses of the card. A fingerprint matching algorithm on the processor may be used to identify a fingerprint match between an enrolled user and a fingerprint sensed by the fingerprint sensor.

A biometric sensor may be used to activate subsequent control of the card by movements, or to activate features denoted as higher security, such as a payment or withdrawal with a payment/bank card, or access to more secure areas when the smartcard is an access card. A biometric authorisation may be required in addition to a movement of the card in order to complete a more secure operation.

In some cases a biometric authorisation may fail or may not be possible. For example in the case of a fingerprint sensor the user's fingerprints may be damaged by injury, or covered up. The sensor may also be damaged or might otherwise be inoperable. In this case the smartcard may advantageously allow for a pre-set, and preferably complex, movement acting as a back-up for biometric authorisation. The complex movement may be a motion sequence that includes two or more movements, for example three, four or five movements such as rotations, translations and so on. Preferably the pre-set movement is user defined and hence may be unique to the user.

A situation that can arise with some forms of biometric sensors and fingerprint sensors in particular is a failure to enroll. This is a fundamental issue with a small percentage of the population, who have fingerprints or other biometric characteristics that for some reason cannot be registered using the known biometric sensors. For fingerprints such failures are usually caused by missing or weak characteristics, such as missing fingers, faint fingerprints as well as damaged fingers. A system providing an alternative to biometric enrolment would also allow the use of biometric cards by those users who would just rather not have their biometric details recorded. The movement sensed by the accelerometer can be used as a non-biometric alternative for a biometric card so that people can still access the system or service without using the biometric system. In this case, a smartcard including a biometric sensor as well as the accelerometer may be provided with the ability to enroll via movements sensed by the accelerometer as an alternative to biometric data. The user may set a movement or sequence of movements for authorisation of the use of the card, such as a complex movement of the type discussed above. This may be the sole purpose of the sensed movements and/or sensed movements may also be used for changing the card between further different operating modes.

Viewed from a fifth aspect, which is not presently claimed, the invention provides a method for controlling a smartcard, the smartcard comprising a processor for controlling operation of the smartcard and an accelerometer for sensing movements of the smartcard, wherein the method comprises detecting movements of the smartcard using the accelerometer and the processor, and switching between different modes of multiple operating modes of the smartcard in response to the detected movements.

The method may include use of a smartcard with features as discussed above in relation to the first aspect or the fourth aspect. The detected movements may be as discussed above and/or the operating modes may be as discussed above.

The method may include allowing the user to specify which movements (including combinations of movements) should activate particular operating modes.

The smartcard may comprise a biometric sensor, such as a fingerprint sensor, which is preferably embedded into the card. The method may include using the biometric sensor may be used to activate subsequent control of the card by movements, or to activate features denoted as higher security, such as a payment or withdrawal with a payment/bank card, or access to more secure areas when the smartcard is an access card.

The method may comprise authenticating the identity of a bearer of a smartcard using a biometric sensor embedded within the smartcard and enabling movement activated interaction of the user with the card only after their identity has been authenticated. The movement activated interaction with the card may be enabled for a set period after biometric authentication, for example a period of hours or days. In this way the user can access the features of the card without continued re-authentication, but with the benefit of the enhanced security provided by the use of biometrics.

The method may include the use of a sequence of movements in place of biometric authorisation, for example to allow for use of some or all operating modes of the card when biometric authorisation fails, or to allow for enrolment without using the biometric sensor.

The invention may also include a method of manufacturing a smartcard. This may consist of providing features as in the first aspect or the fourth aspect. The manufacturing method may also include providing any or all of the optional features discussed above. The method may include programming the processor to function as discussed above. To enhance the distinctions in vibrational patterns and hence allow for greater differences in accelerometer output between cards manufactured using the same process that are exposed to identical movements, then the manufacturing method may include varying the location of the accelerometer and/or adding mass/stiffness elements with differing characteristics and/or at differing locations to the cards so that each individual card has a unique vibration pattern. The method may optionally include adding a mass and/or stiffness element to the card, for example on a circuit board of the card, with the mass and/or stiffness element being selected from a set of elements with differing mass and/or stiffness characteristics. This allows for the added mass and/or stiffness element to be placed at the same location, which can allow for easier manufacture, whilst ensuring variable effects on the movement of the card since the mass and/or stiffness of the added element will vary. Alternatively or additionally a mass and/or stiffness element may be added to the card at a location that varies for each card. This could use an identical mass and/or stiffness element for each card, or the mass and/or stiffness element being selected from a set of elements with differing mass and/or stiffness characteristics.

In yet a further aspect, the present invention may also provide a computer programme product comprising instructions that, when executed on a processor in a smartcard as described above, will cause the processor to identify movements of the smartcard based on the output from the accelerometer, and to switch between different modes of multiple operating modes of the smartcard in response to the detected movements. The instructions may be arranged to cause the processor to operate in accordance with any or all of the optional and preferred features discussed above.

BRIEF DESCRIPTION OF THE DRAWINGS

Certain preferred embodiments on the present invention will now be described in greater detail, by way of example only and with reference to the accompanying drawings, in which.

DETAILED DESCRIPTION

By way of example the invention is described in the context of a fingerprint authorised smartcard that includes contactless technology and uses power harvested from the card reader. These features are envisaged to be advantageous features of one application of the proposed fingerprint failure feature, but are not seen as essential features. The smartcard may hence alternatively use a physical contact and/or include a battery providing internal power, for example. The fingerprint failure feature can also be implemented with appropriate modifications in any other device or system that uses fingerprint authorisation.

Figure 1:
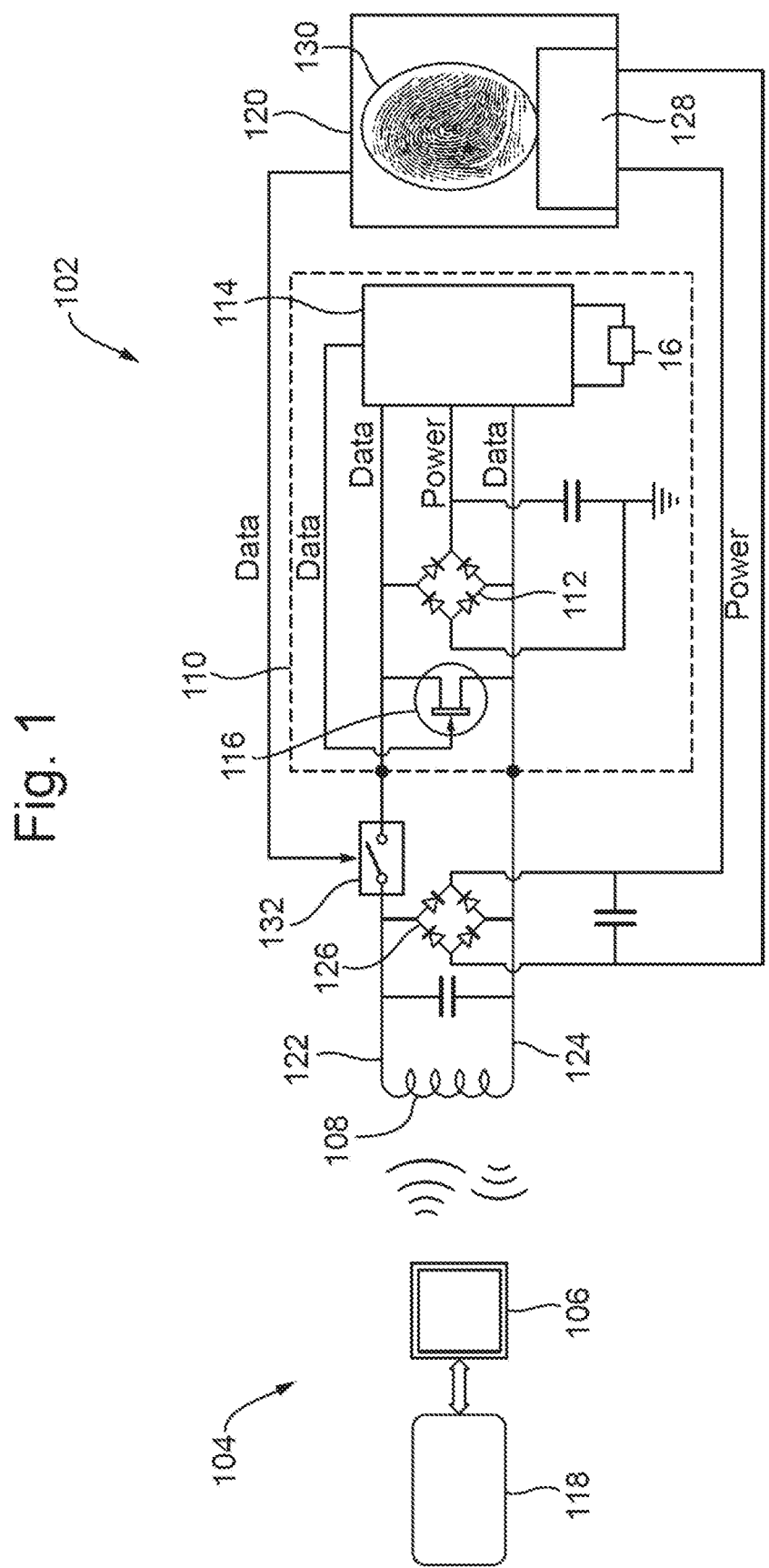
FIG. 1 illustrates a circuit for a smartcard with a fingerprint sensor.

FIG. 1 shows the architecture of a smartcard 102 that is provided with the proposed fingerprint failure feature. A powered card reader 104 transmits a signal via an antenna 106. The signal is typically 13.56 MHz for MIFARE® and DESFire® systems, manufactured by NXP Semiconductors, but may be 125 kHz for lower frequency PROX® products, manufactured by HID Global Corp. This signal is received by an antenna 108 of the smartcard 102, comprising a tuned coil and capacitor, and then passed to a communication chip 110. The received signal is rectified by a bridge rectifier 112, and the DC output of the rectifier 112 is provided to processor 114 that controls the messaging from the communication chip 110.

A control signal output from the processor 114 controls a field effect transistor 116 that is connected across the antenna 108. By switching on and off the transistor 116, a signal can be transmitted by the smartcard 102 and decoded by suitable control circuits 118 in the sensor 104. This type of signalling is known as backscatter modulation and is characterised by the fact that the sensor 104 is used to power the return message to itself.

An accelerometer 16, which is an optional feature, is connected in an appropriate way to the processor 114. The accelerometer 16 can be a Tri-axis Digital Accelerometer as provided by Kionix, Inc. of Ithaca, N.Y., USA and in this example it is the Kionix KXCJB-1041 accelerometer. The accelerometer senses movements of the card and provides an output signal to the processor 114, which is arranged to detect and identify movements that are associated with required operating modes on the card as discussed below. The accelerometer 16 may be used only when power is being harvested from the powered card reader 104, or alternatively the smartcard 102 may be additionally provided with a battery (not shown in the Figures) allowing for the accelerometer 16, and also the related functionalities of the processor 114 and other features of the device to be used at any time.

The smartcard further includes a fingerprint authentication engine 120 including a fingerprint processor 128 and a fingerprint sensor 130. This allows for enrolment and authorisation via fingerprint identification. The fingerprint processor 128 and the processor 114 that controls the communication chip 110 together form a control system for the device. The two processors could in fact be implemented as software modules on the same hardware, although separate hardware could also be used. As with the accelerometer 16 (where present) the fingerprint sensor 130 may be used only when power is being harvested from the powered card reader 104, or alternatively the smartcard 102 may be additionally provided with a battery (not shown in the Figures) allowing power to be provided at any time for the fingerprint sensor 130 and fingerprint processor 128, as well as the processor 114 and other features of the device.

The antenna 108 comprises a tuned circuit including an induction coil and a capacitor, which are tuned to receive an RF signal from the card reader 104. When exposed to the excitation field generated by the sensor 104, a voltage is induced across the antenna 108.

The antenna 108 has first and second end output lines 122, 124, one at each end of the antenna 108. The output lines of the antenna 108 are connected to the fingerprint authentication engine 120 to provide power to the fingerprint authentication engine 120. In this arrangement, a rectifier 126 is provided to rectify the AC voltage received by the antenna 108. The rectified DC voltage is smoothed using a smoothing capacitor and then supplied to the fingerprint authentication engine 120.

Figure 2:
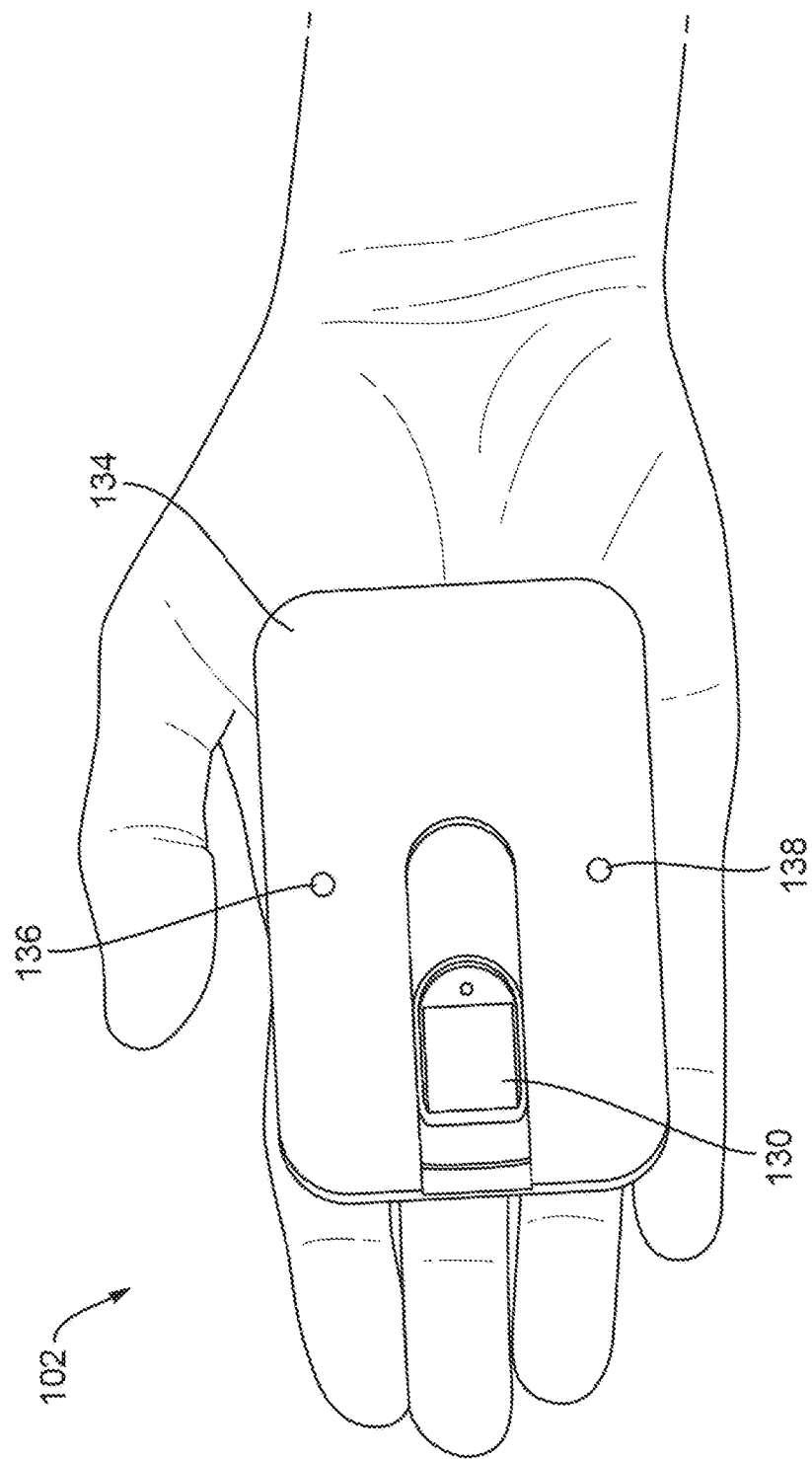
FIG. 2 illustrates a first embodiment of the smartcard including an external housing.
Figure 3:
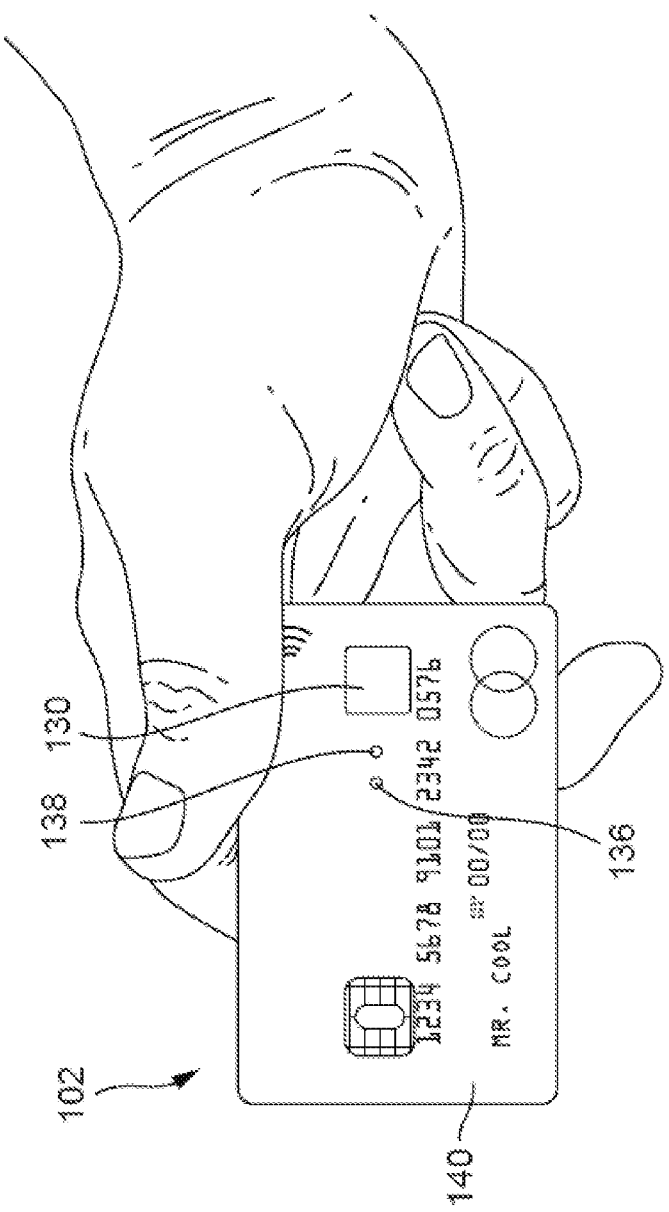
FIG. 3 illustrates a second embodiment of the smartcard which has been laminated.

The fingerprint sensor 130 of the fingerprint authorisation engine, which can be an area fingerprint sensor 130, may be mounted on a card housing 134 as shown in FIG. 2 or fitted so as to be exposed from a laminated card body 140 as shown in FIG. 3. The card housing 134 or the laminated body 140 encases all of the components of FIG. 1, and is sized similarly to conventional smartcards. The fingerprint authentication engine 120 is passive, and hence is powered only by the voltage output from the antenna 108. The processor 128 comprises a microprocessor that is chosen to be of very low power and very high speed, so as to be able to perform fingerprint matching in a reasonable time.

The fingerprint authentication engine 120 is arranged to scan a finger or thumb presented to the fingerprint sensor 130 and to compare the scanned fingerprint of the finger or thumb to pre-stored fingerprint data using the processor 128. A determination is then made as to whether the scanned fingerprint matches the pre-stored fingerprint data. In a preferred embodiment, the time required for capturing a fingerprint image and authenticating the bearer of the card 102 is less than one second.

If a fingerprint match is determined and/or if appropriate movements are detected via the accelerometer 16, then the processor takes appropriate action depending on its programming. In this example the fingerprint authorisation process is used to authorise the use of the smartcard 104 with the contactless card reader 104. Thus, the communication chip 110 is authorised to transmit a signal to the card reader 104 when a fingerprint match is made. The communication chip 110 transmits the signal by backscatter modulation, in the same manner as the conventional communication chip 110. The card may provide an indication of successful authorisation using a suitable indicator, such as a first LED 136.

The fingerprint processor 128 and the processor 114 can receive an indication of a non-fingerprint interaction with the fingerprint sensor 130, which can include any action detectable via the fingerprint sensor 130 as discussed above. The interaction of the user with the card via the fingerprint sensor 130 are used as a part of a non-fingerprint authorisation and also may be used to allow the user to control the smartcard by switching between different operating modes of the smartcard.

In some circumstances, the owner of the fingerprint smartcard 102 may suffer an injury resulting in damage to the finger that has been enrolled on the card 102. This damage might, for example, be a scar on the part of the finger that is being evaluated. Such damage can mean that the owner will not be authorised by the card 102 since a fingerprint match is not made. In this event the processor 114 may prompt the user for a back-up identification/authorisation check via an alternative interaction with the smartcard 102, which in this case includes one or more action(s) detected via the fingerprint sensor 130 and also optionally actions detected via other sensors, such as the accelerometer 16. The card may prompt the user to use a back-up identification/authorisation using a suitable indicator, such as a second LED 138. It is preferred for the non-fingerprint authorisation to require a sequence of interactions with the card by the user, this sequence being pre-set by the user. The pre-set sequence for non-fingerprint authorisation may be set when the user enrolls with the card 102. The user can hence have a non-fingerprint authorisation in the form of a "password" entered using non-fingerprint interactions with the card to be used in the event that the fingerprint authorisation fails. The same type of non-fingerprint authorisation can be used in the event that a user is unable or unwilling to enroll with the card 102 via the fingerprint sensor 130.

Thus, as well as allowing communication via the circuit 110 with the card reader 104 in response to a fingerprint authorisation via the fingerprint sensor 130 and fingerprint processor 128 the processor 114 may also be arranged to allow such communication in response to a non-fingerprint authorisation.

When a non-fingerprint authorisation is used the card 102 could be arranged to be used as normal, or it could be provided with a degraded mode in which fewer operating modes or fewer features of the card 102 are enabled. For example, if the smartcard 102 can act as a bank card then the non-fingerprint authorisation might allow for transactions with a maximum spending limit lower than the usual maximum limit for the card 102.

The processor 114 receives the output from the accelerometer 16 and this allows the processor 114 to determine what movements of the smart card 102 have been made. The processor 114 identifies pre-set movements and other actions of the user that are linked with required changes to the operating mode of the smartcard. As discussed above, the movements may include any type of or combination of rotation, translation, acceleration, impulse and other movements detectable by the accelerometer 16. The other actions of the user may include actions detected via the fingerprint sensor, such as taps, swipes and so on as discussed above.

The operating modes that the processor 114 activates or switches to in response to an identified movement associated with the required change in operating mode may include any mode of operation as discussed above, including turning the card on or off, activating secure aspects of the card 102 such as contactless payment, or changing the basic functionality of the card 102 for example by switching between operating as an access card, a payment card, a transportation smartcard, switching between different accounts of the same type (e.g. two bank accounts), switching between communications protocols (such as blue tooth, wifi, NFC) and/or activating a communication protocol, activating a display such as an LCD or LED display, obtaining an output from the smartcard 102, such as a one-time-password or the like, or prompting the card 102 to automatically perform a standard operation of the smartcard 102.

The processor 114 has an enrolment mode, which may be activated upon first use of the smartcard 102. In the enrolment mode the user is prompted to enroll their fingerprint data via the fingerprint sensor 130. This can require a repeated scan of the fingerprint via the fingerprint sensor 130 so that the fingerprint processor 128 can build up appropriate fingerprint data, such as a fingerprint template. After a successful or an unsuccessful enrolment of fingerprint data the user is prompted to enter a non-fingerprint authorisation. This could be optional in the case of a successful fingerprint enrolment, or compulsory if the fingerprint enrolment was not successful. The non-fingerprint authorisation includes a sequence of interactions with the smartcard 102 including at least one action by the user that is detected via the fingerprint sensor 130. The processor 114 can keep a record of these interactions in a memory, and it is arranged to provide at least partial authorisation to use the functions of the card in the event that the non-fingerprint authorisation is provided by the user.

The processor 114 can have a learn mode to allow for the user to specify which actions (including combinations of actions/interactions) should activate particular operating modes whilst the smartcard 102 is in use. This type of control of the smartcard 102 might be enabled only after a successful fingerprint or non-fingerprint authorisation. In the learn mode the processor 114 prompts the user to make the desired sequence of actions, and to repeat the movements for a predetermined set of times. These movements are then allocated to the required operating mode or to the non-fingerprint authorisation. With this latter feature the learn mode can allow for the sequence of movements used for the non-fingerprint authorisation to be changed by the user in the same way that a traditional PIN can be changed.

It should be apparent that the foregoing relates only to the preferred embodiments of the present invention and the resultant patent. Numerous changes and modifications may be made herein by one of ordinary skill in the art without departing from the general spirit and scope of the invention as defined by the following claims and the equivalents thereof.

I claim:

1. A method for controlling a fingerprint authorisable smartcard having a fingerprint sensor for obtaining fingerprint data from a user's finger or thumb, and a control system for controlling the smartcard; the method comprising:
   providing access to one or more functions of the smartcard in response to identification of an authorised fingerprint; and
   alternatively providing access to the one or more functions of the smartcard when a user is identified via a non-fingerprint authorisation as a part of a fingerprint failure feature of the control system in which a non-fingerprint authorisation acts to replace the fingerprint authorisation;
   wherein the non-fingerprint authorisation requires an interaction with the fingerprint authorisable smartcard by the user, the interaction including one or more action(s) detected via the fingerprint sensor.

2. A method as claimed in claim 1, wherein the fingerprint failure feature is utilised in the event that a user is unwilling or unable to provide fingerprint data for use in a fingerprint authorisation.

3. A method as claimed in claim 1, wherein the fingerprint failure feature is utilised in the event that fingerprint authorisation of an enrolled user is unsuccessful.

4. A fingerprint authorisable smartcard having one or more secure functions, the smartcard comprising:
   a fingerprint sensor for obtaining fingerprint data from a user's finger or thumb, and a control system for controlling the smartcard;
   wherein the control system is arranged to provide access to the one or more functions of the smartcard in response to identification of an authorised fingerprint,
   wherein the control system further includes a fingerprint failure feature in which a non-fingerprint authorisation can act to replace the fingerprint authorisation such that the control system is arranged to provide access to the one or more functions of the smartcard when a user is identified via the non-fingerprint authorisation, and
   wherein the non-fingerprint authorisation requires an interaction with the fingerprint authorisable smartcard by the user, the interaction including one or more action(s) detected via the fingerprint sensor.

5. A fingerprint authorisable smartcard as claimed in claim 4, wherein the action(s) detected via the fingerprint sensor include one or more of a stationary contact with the sensor, a moving contact with the sensor, a time period of contact with the sensor, a direction of movement of contact with the sensor, a number of contacts with the sensor, or a time period where there is no contact with the sensor.

6. A fingerprint authorisable smartcard as claimed in claim 4, wherein the non-fingerprint authorisation requires a combination of different actions.

7. A fingerprint authorisable smartcard as claimed in claim 4, wherein the action(s) include a sequence with parallel and/or perpendicular movements, or more complex movements defined by the user.

8. A fingerprint authorisable smartcard as claimed in claim 4, wherein the actions detected by the fingerprint sensor include a time period of one or more contacts, a number of contacts and/or a spacing in between contacts.

9. A fingerprint authorisable smartcard as claimed in claim 4, wherein the control system is arranged to enroll an authorised user by obtaining fingerprint data via the fingerprint sensor.

10. A fingerprint authorisable smartcard as claimed in claim 4, wherein the control system has an enrolment mode in which a user may enroll their fingerprint via the fingerprint sensor with the fingerprint data generated during enrolment being stored on the memory, and wherein the control system is arranged to prompt the user for enrolment of a non-fingerprint authorisation code in addition to fingerprint enrolment and/or in the event of a failure to enroll the user.

11. A fingerprint authorisable smartcard as claimed in claim 4, wherein the smartcard is an RFID card.

12. A fingerprint authorisable smartcard as claimed in claim 4, wherein the non-fingerprint authorisation includes interactions with the fingerprint sensor and interactions with one or more further sensor.

13. A fingerprint authorisable smartcard as claimed in claim 12, wherein the one or more further sensor comprises a one or more of a button, a capacitive sensor and an accelerometer.

14. A fingerprint authorisable smartcard as claimed in claim 4, wherein the smartcard comprises an accelerometer for sensing movements of the smartcard, wherein the control system is arranged to identify movements of the smartcard based on the output of the accelerometer, and wherein the non-fingerprint authorisation includes a combination of one or more action(s) detected via the fingerprint sensor as well as a movement sensed by the accelerometer.

15. A fingerprint authorisable smartcard as claimed in claim 4, wherein action(s) detected via the fingerprint sensor are able to prompt the control system to switch between different modes of multiple operating modes of the smartcard.

16. A method as claimed in claim 1, comprising use of the smartcard of claim 4.

17. A computer programme product comprising instructions that, when executed on a control system in a fingerprint authorisable smartcard as claimed in claim 4, will cause the control system to:
provide access to the one or more functions of the smartcard in response to identification of an authorised fingerprint; and
alternatively provide access to of the one or more functions of the smartcard when a user is identified via a non-fingerprint authorisation as a part of a fingerprint failure feature of the control system in which a non-fingerprint authorisation can act to replace the fingerprint authorisation;
wherein the non-fingerprint authorisation requires an interaction with the fingerprint authorisable smartcard by the user, the interaction including one or more action(s) detected via the fingerprint sensor.

18. A method of adapting a fingerprint authorisable smartcard in order to provide a fingerprint failure feature, wherein the fingerprint authorisable smartcard comprises a fingerprint sensor for obtaining fingerprint data from a user's finger or thumb, and a control system for controlling the smartcard; the method comprising installing a computer programme product as claimed in claim 17 on the fingerprint authorisable device.

* * * * *